US012661819B2

(12) United States Patent　　　(10) Patent No.:　US 12,661,819 B2
Kou et al.　　　　　　　　　　　(45) Date of Patent:　Jun. 23, 2026

(54) GLUE-CORE SEPARATION OPERATION SYSTEM AND EQUIPMENT FOR SEPARATING GLUE-CORE OF CONVEYOR BELT JOINT BEFORE VULCANIZATION

(71) Applicant: TAIYUAN UNIVERSITY OF TECHNOLOGY, Taiyuan (CN)

(72) Inventors: Ziming Kou, Taiyuan (CN); Juan Wu, Taiyuan (CN); Guijun Gao, Taiyuan (CN); Shaoni Jiao, Taiyuan (CN); Jun Yang, Taiyuan (CN); Haiqing Wang, Taiyuan (CN); Jiabao Xue, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 283 days.

(21) Appl. No.: 18/553,565

(22) PCT Filed: Dec. 13, 2022

(86) PCT No.: PCT/CN2022/138779
§ 371 (c)(1),
(2) Date: Oct. 1, 2023

(87) PCT Pub. No.: WO2024/001064
PCT Pub. Date: Jan. 4, 2024

(65) Prior Publication Data
US 2025/0073942 A1　　Mar. 6, 2025

(30) Foreign Application Priority Data

Jun. 27, 2022　(CN) .......................... 202210745326.1

(51) Int. Cl.
B26D 7/06　　　(2006.01)
B26D 7/26　　　(2006.01)
(Continued)

(52) U.S. Cl.
CPC ......... B26D 7/0625 (2013.01); B26D 7/2628 (2013.01); B26D 11/00 (2013.01); B65G 15/36 (2013.01)

(58) Field of Classification Search
CPC .... B26D 7/0625; B26D 7/2628; B26D 11/00; B65G 15/36
See application file for complete search history.

(56) References Cited

U.S. PATENT DOCUMENTS 3,895,990　A　*　7/1975　Josteit ................... B29C 65/483
　　　　　　　　　　　　　　　　　156/304.3
5,777,150　A　*　7/1998　Nomoto ............... C07D 307/81
　　　　　　　　　　　　　　　　　560/60
(Continued)

FOREIGN PATENT DOCUMENTS

CN　　　101245826　A　　8/2008
CN　　　102481695　A　　5/2012
(Continued)

OTHER PUBLICATIONS

International Search Report in the international application No. PCT/CN2022/138779, mailed on Mar. 15, 2023. 8 pages with English translation.

*Primary Examiner* — Liang Dong
(74) *Attorney, Agent, or Firm* — Syncoda LLC; Feng Ma

(57)　　　　　ABSTRACT

The disclosure provides a separation device for steel cord cores of the conveyor belt, relates to conveyor belt steel cord core separation technology and solves the problems of high labor intensity and long time consumption when separating steel cord cores of a conveyor belt joint. The separation device comprises a mount, cutting mechanism and a conveying mechanism. The cutting mechanism is connected to the mount and is provided with knives, configured to separate steel cord cores of a joint site of a conveyor belt and arranged along the width direction of the conveyor belt. The dimension of the knife along the width direction of the
(Continued)

conveyor belt is greater than or equal to the width of the conveyor belt. The conveying mechanism is fixedly connected to the mount and configured to move the conveyor belt joint site along the knife. The separation device is configured to separate steel cord cores of a conveyor belt joint site.

16 Claims, 9 Drawing Sheets

(51) Int. Cl.
  *B26D 11/00* (2006.01)
  *B65G 15/36* (2006.01)

(56) References Cited

U.S. PATENT DOCUMENTS

| | | | |
|---|---|---|---|
| 2006/0070504 A1 | 4/2006 | Downing | |
| 2012/0160075 A1 | 6/2012 | Matsudaira | |
| 2015/0270034 A1* | 9/2015 | Wabnegger | B21F 11/00 |
| | | | 241/101.2 |

FOREIGN PATENT DOCUMENTS

| | | | |
|---|---|---|---|
| CN | 103640322 A | 3/2014 | |
| CN | 105856800 A | 8/2016 | |
| CN | 106003765 A | 10/2016 | |
| CN | 109968682 A | 7/2019 | |
| CN | 111604989 A | 9/2020 | |
| CN | 111605203 A | 9/2020 | |
| CN | 213194707 U | 5/2021 | |
| CN | 213830378 U | 7/2021 | |
| CN | 214002995 U | 8/2021 | |
| CN | 115179357 A | 10/2022 | |
| JP | 2000225617 A | 8/2000 | |

* cited by examiner

211

Front view                                    Side view

Top view

212

Front view                                    Side view

Top view

A— A

1

GLUE-CORE SEPARATION OPERATION SYSTEM AND EQUIPMENT FOR SEPARATING GLUE-CORE OF CONVEYOR BELT JOINT BEFORE VULCANIZATION

CROSS-REFERENCE TO RELATED APPLICATION

The present application claims the priority of the Chinese patent application No. 202210745326.1, filed on Jun. 27, 2022, and entitled "GLUE-CORE SEPARATION OPERA-TION SYSTEM AND EQUIPMENT FOR SEPARATING GLUE-CORE OF CONVEYOR BELT JOINT BEFORE VULCANIZATION", the entire content of which is incorporated herein by reference.

TECHNICAL FIELD

Embodiments of the present disclosure relate to a separation technology for a steel cord core of a conveyor belt, and relates in particular to a separation device for separating the steel cord core of the conveyor belt.

BACKGROUND

Belt conveyors are important equipment for transporting bulk materials. With the development of belt conveyors towards long distances and large volumes, conveyor belts selected for the belt conveyors generally have inner core structures. The inner core structure of common conveyor belts is a steel cord. Conveyor belts having a steel cord inner core have advantages such as high strength and low elongation, and thus are widely used. For a long-distance conveyor belt, the length thereof is several thousand meters or even tens of thousands of meters. During the installation of the conveyor belt, conveyor belts of shorter lengths need to be vulcanized and glued together so as to form a conveyor belt of a longer length. In addition, in the daily use of a conveyor belt, it is inevitable that the conveyor belt may be damaged due to scratches caused by hard objects, and the position of the scratch on the conveyor belt needs to be replaced. At which time, the conveyor belt also needs to be glued. However, during the conveyor belt is glued, it is necessary to separate the glue layer and steel cord cores at the joint location of the conveyor belt.

In the related art, the separation of steel cord cores of a conveyor belt joint requires cutting off in sequence the glue layer around each steel cord core along the steel cord core of the conveyor belt. If the conveyor belt includes many steel cord cores, separating the steel cord cores of the conveyor belt from the glue layer requires high labor intensity and long time consumption.

SUMMARY

In order to solve the problems described above, a separation device for steel cord cores of the conveyor belt is provided in the embodiments of the present disclosure. The device has the following advantages: a glue layer of a joint site of a conveyor belt can be effectively cut off with high operation efficiency, thereby solving the problems of high labor intensity and long time consumption when separating steel cord cores and the glue layer of the conveyor belt joint.

In order to achieve the above objective, the technical solution in the embodiments of the present disclosure is implemented as follows:

Embodiments of the present disclosure provide a separation device for steel cord cores of a conveyor belt, comprising: a mount, at least one cutting mechanism and a conveying mechanism. The cutting mechanism is connected to the mount, the cutting mechanism is provided with knives configured to separate steel cord cores of a joint site of a conveyor belt. The knives are arranged along the width direction of the conveyor belt. A dimension of each knife along the width direction of the conveyor belt is greater than or equal to the width of the conveyor belt. The conveying mechanism is fixedly connected to the mount, and is configured to move the conveyor belt joint site along the knives.

In the separation device for steel cord cores of the conveyor belt provided in the embodiments of the present disclosure, the dimension of the knife along the width direction of the conveyor belt is greater than or equal to the width of the conveyor belt, so that the steel cord cores of the conveyor belt joint site can be separated along the entire width direction of the conveyor belt from one cut with the knife. Therefore, the operation efficiency of the separation device for steel cord cores of the conveyor belt provided in the embodiments of the present disclosure is improved, thereby solving the problems of high labor intensity and long time consumption when separating the steel cord cores of the conveyor belt joint.

In one embodiment of the present disclosure, there are two kinds of knife edges of the knives, i.e. a flat knife edge and a shaped knife edge. The flat knife edge is in a straight line and is configured to separate the steel cord cores along an extension direction of the conveyor belt. The shaped knife edge comprises a plurality of semi-circular cutting edges, and the shaped knife edge is configured to separate the steel cord cores along a direction perpendicular to the extension direction of the conveyor belt.

In one embodiment of the present disclosure, a diameter of the semi-circular cutting edges is equal to a diameter of the steel cord cores of the conveyor belt, and a spacing between the semi-circular cutting edges is equal to a spacing between the steel cord cores of the conveyor belt.

In one embodiment of the present disclosure, the tips of the knife edges of the knives are inclined toward the conveyor belt joint site when separating the steel cord cores of the conveyor belt joint site.

In one embodiment of the present disclosure, the mount is a box structure comprising an upper box and a lower box. The upper box and the lower box are detachably connected to each other, the cutting mechanism is disposed at an interface between the upper box and the lower box, and the conveying mechanism is disposed in the lower box.

In one embodiment of the present disclosure, a first opening is provided at the interface between the upper box and the lower box, the cutting mechanism is disposed at the first opening, and an extension direction of the knives is parallel to an extension direction of the first opening.

In one embodiment of the present disclosure, the separation device comprises two cutting mechanisms which are arranged on two sides of the first opening respectively, knife edges of the knives of the two cutting mechanism are arranged opposite to one another, and the conveying mechanism is configured to move the conveyor belt joint site between two knives.

In one embodiment of the present disclosure, an adjustment assembly is provided between the cutting mechanisms and the box, the adjustment assembly is movably connected to the box, and is configured to allow the knives to slide on the box in a direction perpendicular to the first opening, and the adjustment assembly is further configured to lock the cutting mechanism in a target position.

In one embodiment of the present disclosure, the adjustment assembly comprises an adjustment screw, the adjustment screw is movably connected to the cutting mechanism, the box is provided with an adjustment nut corresponding to the adjustment screw, the adjustment screw is in threaded cooperation with the adjustment nut, a rotation of the adjustment screw drives the cutting mechanism to slide on the box in a direction perpendicular to the first opening, and the cutting mechanism is configured to be locked in a target position by a threaded self-locking of the adjustment screw and the adjustment nut.

In one embodiment of the present disclosure, the lower box is provided with a second opening, the second opening is parallel to the first opening, a center line of the second opening coincides with and a center line of the first opening, and the conveying mechanism configured to move the conveyor belt along the first opening and the second opening.

In one embodiment of the present disclosure, a guide assembly is provided within the box at a position adjacent to the second opening, the guide assembly comprises guide portions, and the guide portions are rotatable along their own axis and are configured to guide the conveyor belt.

In one embodiment of the present disclosure, the conveying mechanism comprises a drum, an axis of rotation of the drum is located in the lower box and is parallel to the first opening, a first driving portion corresponding to the drum is provided outside of the box, the first driving portion is configured to drive the drum to rotate, and the conveyor belt is in contact with a surface of the drum and moves with a rotation of the drum.

In one embodiment of the present disclosure, the conveying mechanism further comprises a roller for pressing the conveyor belt, the roller is disposed in the lower box and is parallel to the drum, a diameter of the roller is less than a diameter of the drum, a gap is present between the roller and the drum, a dimension of the gap is less than a thickness of the conveyor belt, the roller is configured to press the conveyor belt against a surface of the drum, and the roller is rotatable around its own axis.

In one embodiment of the present disclosure, a second driving portion corresponding to the roller is provided outside of the box, a transmission mechanism is provided between the second driving portion and the roller, and a movement parameter of the second driving portion is controlled to allow the roller to rotate around the drum between a position directly above the drum and a position directly below the drum.

In one embodiment of the present disclosure, the transmission mechanism comprises at least one driving gear and at least one driven gear, the driving gear is disposed on the second driving portion, the driven gear is coaxially arranged with the drum and is rotatable around the drum, the driving gear is externally meshed with the driven gear, the roller is connected to the driven gear, the second driving portion drives the driving gear and the driven gear to rotate, and the driven gear drive the roller to rotate around the drum.

In one embodiment of the present disclosure, the driven gear is provided with a raised structure radially extending therefrom, the roller is connected to the raised structure, and the raised structure drives the roller to rotate around the drum with a rotation of the driven gear.

In one embodiment of the present disclosure, the driving gear and the roller are disposed on different sides of a movement path of the conveyor belt, the driving gear and the drum are disposed on one side of the movement path of the conveyor belt, and the roller is disposed on another side of the movement path of the conveyor belt.

In one embodiment of the present disclosure, the transmission mechanism comprises two driven gears which are disposed at two ends of the drum respectively, and the roller is disposed between the two driven gears.

In one embodiment of the present disclosure, the transmission mechanism comprises two driving gears corresponding to the two driven gears, the two driving gears share the second driving portion, and the two driving gears are connected to one another by means of a synchronous shaft.

REFERENCE SIGNS

Figure 1:
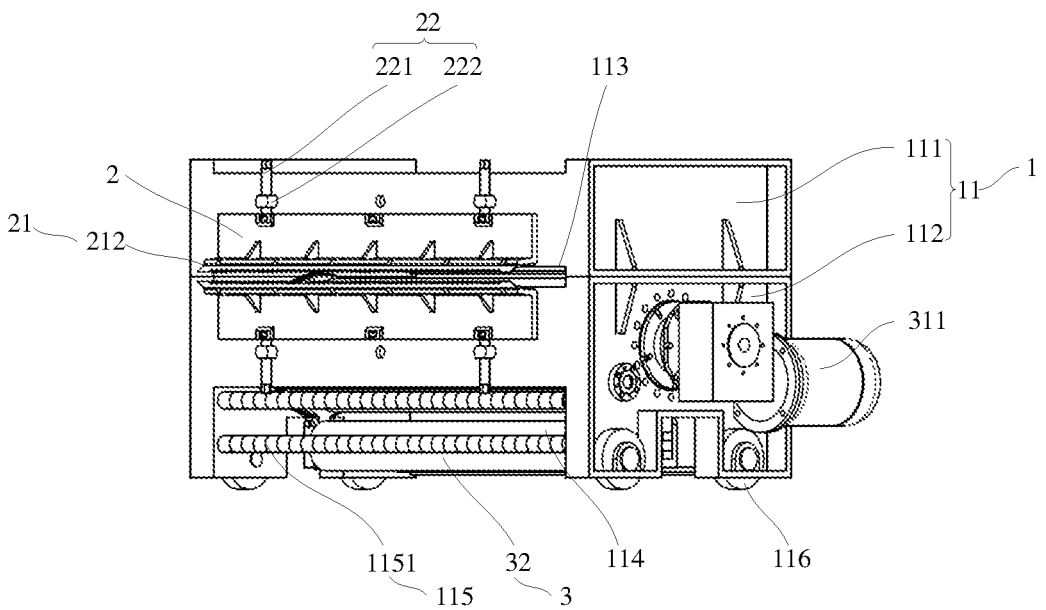
FIG. 1 is an overall schematic view of the separation device for steel cord cores of the conveyor belt provided in an embodiment of the present disclosure.

1—mount; 11—box; 111—upper box; 112—lower box; 113—first opening; 114—second opening; 115—guide assembly; 1151—guide portion; 1152—guide shaft; 116—moving wheel; 2—cutting mechanism; 21—knife; 211—flat knife edge; 212—shaped knife edge; 22—adjustment assembly; 221—adjustment screw; 222—adjustment nut; 3—conveying mechanism; 31—drum; 311—first driving portion;

32—roller; 321—second driving portion; 322—transmission mechanism; 3221—driving gear; 3222—driven gear; 3223—raised structure; and 323—synchronous shaft.

DETAILED DESCRIPTION

In order for the objectives, technical solutions, and advantages of the embodiments of the present disclosure to be clearer, the specific technical solutions of the present disclosure are described in further detail below in view of the drawings in the embodiments of the present disclosure. The following embodiments are used to illustrate the present disclosure, but are not used to limit the scope of the present disclosure.

In the embodiments of the present disclosure, the terms "first" and "second" are used merely for descriptive purposes, and are not to be construed as indicating or implying relative importance or implicitly specifying the quantity of indicated technical features. As such, features defined with "first" and "second" may explicitly or implicitly include one or more of the features. In the description of the embodiments of the present disclosure, unless otherwise indicated, "a plurality" means two or more.

Further, in the embodiments of the present disclosure, directional and positional terms such as "upper", "lower", "left" and "right" are defined relative to the directions and positions of the schematic placement of components in the drawings. It should be understood that these directional terms are relative concepts, which are used for relative description and clarification, and which may correspondingly change according to changes in the directions and positions in which components are placed in the drawings.

In the embodiments of the present disclosure, unless otherwise explicitly specified and defined, the term "connection" shall be understood in a broad sense. For example, the "connection" may be a fixed connection, a detachable connection, or an integral connection; or it may be a direct connection or an indirect connection by means of an intermediate medium.

In the embodiments of the present disclosure, the terms "comprise", "include" or any other variation thereof, are intended to encompass non-exclusive inclusion, so that processes, methods, articles or devices including a series of elements, include not only those elements, but also other elements that are not explicitly listed, or the elements inherent to such processes, methods, articles, or devices are also included. In the absence of more limitations, elements defined by the phrase "comprising a . . . " does not preclude the presence of additional identical elements in processes, methods, articles, or devices comprising the elements.

In the embodiments of the present disclosure, the words such as "exemplary" or "for example" are used to mean examples, instances or illustrations. Any embodiment or design solution described as "exemplary" or "for example" in the embodiments of the present disclosure should not be construed as being preferred or more advantageous than other embodiments or design solutions. Rather, the use of the words such as "exemplary" or "for example" is intended to present relevant concepts in a specific manner.

Embodiments of the present disclosure provide a separation device for separating a steel cord core of a conveyor belt, which is suitable for use in vulcanizing and gluing of joints of conveyor belt. Prior to vulcanizing and gluing a joint of a conveyor belt, it is necessary to separate steel cord cores of the conveyor belt joint from a glue layer, cut off the glue layer around the steel cord cores of the conveyor belt to expose the steel cord cores of the conveyor belt, and then overlap the steel cord cores of the conveyor belt over one another. Finally, the conveyor belt is subjected to a vulcanizing and gluing operation.

Specifically, with reference to FIG. 1, the separation device for steel cord cores of the conveyor belt provided in an embodiment of the present disclosure comprises a mount 1, cutting mechanism 2, and a conveying mechanism 3. The mount 1 provides a mounting basis for other mechanisms of the separation device for the steel cord core of the conveyor. The cutting mechanism 2 is connected to the mount 1. The cutting mechanism 2 is provided with a knife 21. The knife 21 is configured to separate steel cord cores of a joint site of a conveyor belt, and specifically, to cut off a glue layer around the steel cord cores of the conveyor belt. The knife 21 is arranged in the width direction of the conveyor belt, and the dimension of the knife 21 in the width direction of the conveyor belt is greater than or equal to the width of the conveyor belt. The conveying mechanism 3 is fixedly connected to the mount 1, and is configured to allow the conveyor belt joint site to move along the knife 21. It should be noted that the conveyor belt joint site mentioned here refers to a site of the conveyor belt in which the steel cord cores and the glue layer need to be separated, and for the vulcanizing and gluing work of the conveyor belt joint, the length of the conveyor belt joint site needs to be determined according to the material of the conveyor belt and the use load of the conveyor belt. In the embodiments of the present disclosure, the length of the conveyor belt joint site does not specifically refer to a certain length, and is determined according to the material of the conveyor belt and the use load of the conveyor belt, and the embodiments of the present disclosure are not limited thereto.

For example, in some embodiments of the present disclosure, the mount 1 may be made of profile steel material. The shape of the mount 1 is suitable for serving as a base. For example, a base may be formed of channel steel by welding, and the cutting mechanism 2 and the conveying mechanism 3 are all mounted on the base. In some other embodiments of the present disclosure, the mount 1 may also be made into a frame type. For example, a frame type structure may be formed of channel steel by welding, and the cutting mechanism 2 and the conveying mechanism 3 are all mounted within the frame. In other embodiments of the present disclosure, with reference to FIG. 1, the mount 1 may also be in the form of a box 11. The cutting mechanism 2 and the conveying mechanism 3 are all mounted within the box 11. The space within the box 11 can be isolated from the external space by making the mount 1 as the box 11, so as to prevent movable components within the box 11 from doing harm to personnel. There are many options for producing the mount 1, and the embodiments of the present disclosure are not limited in this regard.

The cutting mechanism 2 may be connected to the mount 1 by various connecting manners. The cutting mechanism 2 may be connected to the mount 1 by means of a fastener, and the cutting mechanism 2 can be conveniently replaced or adjusted by means of the fastener connection. The cutting mechanism 2 may also be connected with the mount 1 by means of a welding. The welding can allow the connection between the cutting mechanism 2 and the mount 1 to be more secure; however, it is not easy to adjust or maintain the cutting mechanism 2.

Knife 21 is provided on the cutting mechanism 2, and the knife 21 is configured to separate the steel cord cores of the conveyor belt joint site. The form of the cutting mechanism 2 is not defined in the embodiments of the present disclosure, as long as the knife 21 can be connected to the cutting mechanism 2, and the cutting mechanism 2 can also connected to the mount 1. For example, the cutting mechanism 2 may be a steel plate structure, one end of the steel plate is mounted with a knife 21, and the other end of the steel plate is connected to the mount 1. It is also possible that, with reference to FIG. 1, the cutting mechanism 2 is in the form of an angle iron structure, one end of the angle iron structure is connected to a knife 21, and the other end of the angle iron structure is movably connected to the mount 1. To increase the strength of the cutting mechanism 2, a rib plate is further provided at the corner of the angle iron structure.

It should be noted that the connection between the knife 21 and the cutting mechanism 2 may also be achieved in many implementations. For example, the knife 21 may be clamped on the cutting mechanism 2, and the knife 21 may also be connected to the cutting mechanism 2 by means of a fastener. The embodiments of the present disclosure are not limited thereto.

Meanwhile, the knife 21 is arranged along the width direction of the conveyor belt. That is, the extension direction of the knife 21 is perpendicular to the extension direction of the conveyor belt, and is also perpendicular to the length direction of the conveyor belt, so that the effect of the knife 21 can be maximized as the area cut by the knife 21 is maximized. Further, the dimension of the knife 21 along the width direction of the conveyor belt is greater than or equal to the width of the conveyor belt. This can increase the cutting efficiency of the knife 21, so that the glue layer in the entire width direction of conveyor belt may be cut off by one cut, thereby improving the operation efficiency of the separation device for steel cord cores of the conveyor belt provided in the embodiments of the present disclosure, and solving the problems of high labor intensity and long time consumption for separating the steel cord cores of the conveyor belt.

In addition, the conveying mechanism 3 of the separation device for steel cord cores of the conveyor belt provided in the embodiment of the present disclosure is fixedly connected to the mount 1, and the conveying mechanism 3 is configured to drive the conveyor belt to move, thereby moving the conveyor belt joint site along the knife 21. By means of the conveying mechanism 3, the separation device for steel cord cores of the conveyor belt provided in the embodiments of the present disclosure can use machinery instead of labor as much as possible, further improving the operation efficiency of separation of the steel cord cores of the conveyor belt.

There are also many options for the conveying mechanism 3. For example, in some embodiments of the present disclosure, a traction device is disposed at the end of the conveyor belt joint, and the traction device pulls the conveyor belt by means of a motor to allow the conveyor belt joint site to move along the knife 21, so that the conveyor belt joint site is cut by the knife 21. Therefore, the purpose of separating the steel cord cores of the conveyor belt joint site by the knife 21 can be achieved. In some other embodiments of the present disclosure, a drum 31 may also be used. Friction force between the drum 31 and the conveyor belt is used to allow the conveyor belt to move with the rotation of the drum 31, so that the conveyor belt joint site moves along the knife 21, to achieve the purpose of separating the steel cord cores of the conveyor belt joint site by the knife 21.

Figure 2:
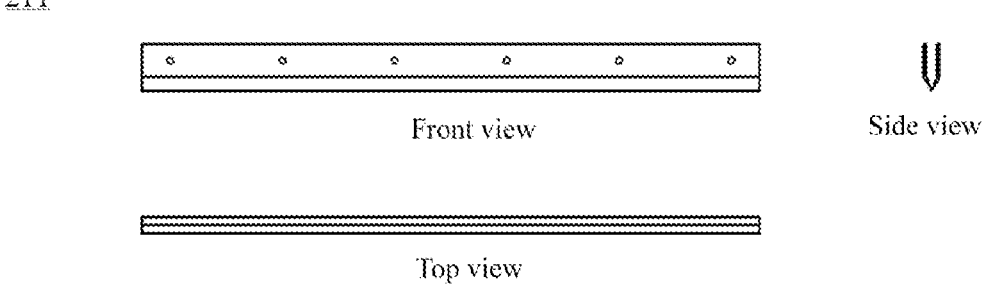
FIG. 2 is a three-view drawing of a knife of the separation device for steel cord cores of the conveyor belt provided in an embodiment of the present disclosure being a flat knife edge.
Figure 3:
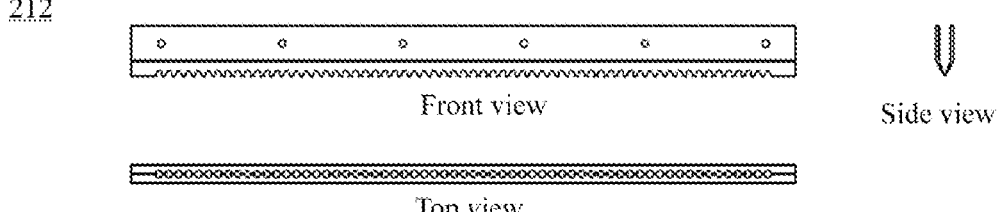
FIG. 3 is a three-view drawing of a knife of the separation device for steel cord cores of the conveyor belt provided in an embodiment of the present disclosure being a shaped knife edge.

On that basis, with reference to FIGS. 2 and 3, the knife 21 of the conveyor belt separation device provided in the embodiment of the present disclosure has two kinds of knife edges, that is, a flat knife edge 211 and a shaped knife edge 212, respectively. With reference to FIG. 2, the cutting edge of the flat knife edge 211 is of a straight line type, similar to a common knife. The flat knife edge 211 is configured to separate the glue layer from the steel cord cores of the conveyor belt along the extension direction of the conveyor belt. Further, with reference to FIG. 3, a plurality of semi-circular cutting edges are arranged on the shaped knife edge 212, and configured to separate the glue layer from the steel cord cores of the conveyor belt in a direction perpendicular to the extension direction of the conveyor belt, that is, the glue layer of the conveyor belt is cut off along the length direction of the conveyor belt to separate the steel cord cores from the glue layer of the conveyor belt. For example, in the case that the flat knife edge 211 is arranged on the upper surface of the conveyor belt joint site, and the flat knife edge 211 is inserted into the interior of the conveyor belt and in closely contact with the upper side of the steel cord cores of the conveyor belt, as the conveyor belt joint site is moved relative to the flat knife edge 211 by means of the conveying mechanism 3, the flat knife edge 211 may cut off the glue layer above the steel cord cores of the conveyor belt. In the case that flat knife edges 211 are arranged on both the upper surface and the lower surface of the conveyor belt, the glue layer above and below the steel cord cores of the conveyor belt may be cut off at one time. The glue layer between steel cord cores of the conveyor belt joint site is then cut off with the shaped knife edge 212. Since the steel cord cores of the conveyor belt extends along the extension direction of the conveyor belt, and the steel cords are arranged along the width direction of the conveyor belt, the shaped knife edge 212 cuts off the glue layer between the steel cord cores along the width direction of the conveyor belt, which is specifically as follows: the semi-circular cutting edge of the shaped knife edge 212 is mounted to be in fit with the steel cord cores of the conveyor belt, with the semi-circular cutting edge being in closely contact with the outer periphery of the steel cord cores; then, the conveyor belt joint site is moved relative to the shaped knife edge 212 by means of the conveying mechanism 3, so that the shaped knife edge 212 may cut off the glue layer between the steel cord cores of the conveyor belt joint site. In the case that on both the upper surface and the lower surface of the conveyor belt the shaped knife edge 212 is arranged, the semi-circular cutting edges between two shaped knife edges 212 is disposed corresponding to the steel cord cores, so that the glue layer between the steel cord cores of the conveyor belt may be cut off at one time.

On that basis, with reference to FIG. 3, the diameter of the semi-circular cutting edges of the shaped knife edge 212 is equal to the diameter of the steel cord cores of the conveyor belt. Moreover, the spacing between the semi-circular cutting edges is equal to the spacing between the steel cord cores of the conveyor belt. By configuring the diameter of the semi-circular cutting edge to be equal to the diameter of the steel cord cores of the conveyor belt, the glue layer outside of the steel cord cores of the conveyor belt may be effectively cut off, thereby ensuring the quality of cutting the glue layer near the steel cord cores of the conveyor belt. In addition, the spacing between the semi-circular cutting edges is configured to be equal to the spacing between the steel cord cores of the conveyor belt, so that the glue layer between the steel cord cores of the conveyor belt may be cut off along the width direction of the conveyor belt at one time.

Figure 4:
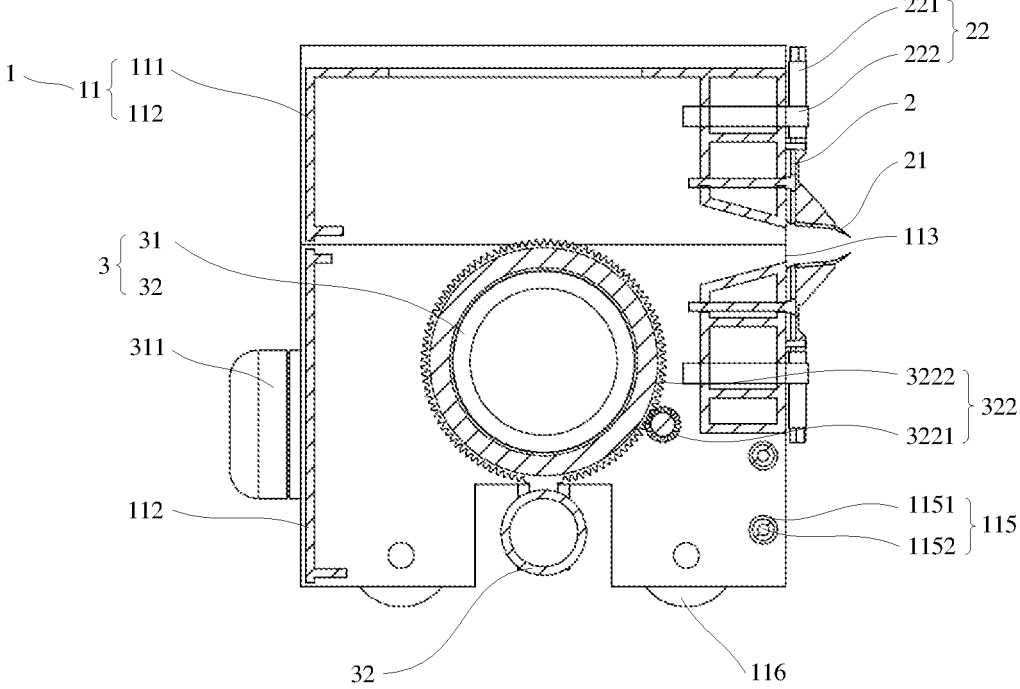
FIG. 4 is a cross-sectional schematic view of the separation device for steel cord cores of the conveyor belt provided in an embodiment of the present disclosure.

Further, with reference to FIG. 4, in some embodiments of the present disclosure, the tip of the cutting edge of a knife 21 of the separation device for steel cord cores of the conveyor belt is inclined toward a side of the conveyor belt joint site when separating the steel cord cores of the conveyor belt joint site. Specifically, the position in which the knife 21 is mounted to the cutting mechanism 2 may be inclined at an angle, and the direction of inclination is consistent with the orientation of the knife 21, so that the tips of the knife edges of the knife are inclined toward a side of the conveyor belt joint site when separating the steel cord cores of the conveyor belt joint site.

With reference to FIGS. 2 and 3, the knife edges of the knife 21 may also be disposed at an angle, so that the tips of the knife edges of the knife 21 are inclined toward a side of the conveyor belt joint site when separating the steel cord cores of the conveyor belt joint site. That is, there is an angle between the extension direction of the knife edges of the knife 21 and the conveyor belt, and the extension direction of the knife edges of the knife 21 is opposite to the direction of movement of the conveyor belt when cutting the glue layer of the conveyor belt by the knife 21.

To facilitate the assembly or maintenance of the separation device for steel cord cores of the conveyor belt provided in the embodiments of the present disclosure, with reference to FIGS. 1 and 4, in some embodiments of the present disclosure, the mount 1 is in the form of a box 11, including an upper box 111 and a lower box 112. Moreover, the upper box 111 and the lower box 112 are detachably connected, so that the mechanisms within the box 11 can be conveniently assembled or maintained. In addition, to facilitate the arrangement of the cutting mechanism 2 and the conveying mechanism 3, in consideration of movement of the conveyor belt, the cutting mechanism 2 is disposed at the connection interface between the upper box 111 and the lower box 112, and the conveying mechanism 3 is disposed within the lower box 112. With reference to FIG. 1, to reinforce the strength of the box 11, a reinforcing rib plate is further provided near the interface between the upper box 111 and the lower box 112, so that the overall strength of the separation device for steel cord cores of the conveyor belt provided in the embodiments of the present disclosure can be improved, and the separation device for steel cord cores of the conveyor belt can be prevented from deformation.

On said basis, with reference to FIGS. 1 and 4, a first opening 113 is provided at the connection area between the upper box 111 and the lower box 112, the cutting mechanism 2 is disposed at the first opening 113, and the extension direction of the knife 21 is parallel to the extension direction of the first opening 113. Specifically, to provide the first opening 113, a notch is provided at the edge of the side of the upper box 111 towards the lower box 112, while a notched is provided at a corresponding position of the lower box 112, so that after the upper box 111 and the lower box 112 are connected, the notches of the upper box 111 and the lower box 112 together form the first opening 113. In addition, to support the cutting mechanism 2, a reinforcement structure is formed by welding a steel plate at a part of the upper box 111 and the lower box 112 near the first opening 113, thereby further increasing the strength of the box 11 near the first opening 113.

Further, in some embodiments of the present disclosure, with reference to FIGS. 1 and 4, there are two cutting mechanisms 2, which are arranged on two sides of the first opening 113 respectively. The knife edges of the knives 21 of the two cutting mechanisms 2 are arranged opposite to one another, and correspond to the upper and lower surfaces of the conveyor belt respectively. The conveying mechanism 3 can allow the conveyor belt joint site to move between the two knives, and when the conveyor belt joint site is moved between the two knives 21, the two knives 21 may simultaneously cut off the glue layer on the upper and lower sides of the conveyor belt. With such an arrangement, the operation efficiency of the separation device for steel cord cores of the conveyor belt provided in the embodiments of the present disclosure for separating the steel cord cores of the conveyor belt is further improved.

In addition, with reference to FIGS. 1 and 4, an adjustment assembly 22 is further provided between the cutting mechanism 2 and the box 11, the adjustment assembly 22 is movably connected to the box 11, the adjustment assembly 22 can allow the cutting mechanism 2 to slide on the box 11 in a direction perpendicular to the first opening 113, and an adjustment device may also allow the cutting mechanism 2 to be locked in a target position.

In some embodiments of the present disclosure, the adjustment assembly 22 may be a fastener. Specifically, an elongated hole may be provided in the box 11 or the cutting mechanism 2 along the vertical direction of the first opening 113. As such, the position of the cutting mechanism 2 can be adjusted and then is fastened by the fastener, so that the cutting mechanism 2 may be locked in the target position.

In further embodiments of the present disclosure, with reference to FIGS. 1 and 4, the adjustment device is an adjustment screw 221. The adjustment screw 221 is movably connected to the cutting mechanism 2 to enable the adjustment screw 221 to rotate relative to the cutting mechanism 2.

It should be noted that the adjustment screw 221 is movably connected to the cutting mechanism 2 in various manners. In some embodiments of the present disclosure, a spherical hole structure may be provided on the cutting mechanism 2, a corresponding spherical protrusion is provided at a corresponding end of the adjustment screw 221. The spherical protrusion at the end of the adjustment screw 221 is engaged into the spherical hole on the cutting mechanism 2, so that the adjustment screw 221 may be kept connected with the cutting mechanism 2, and the adjustment screw 221 can rotate relative to the cutting mechanism 2.

Figure 5:
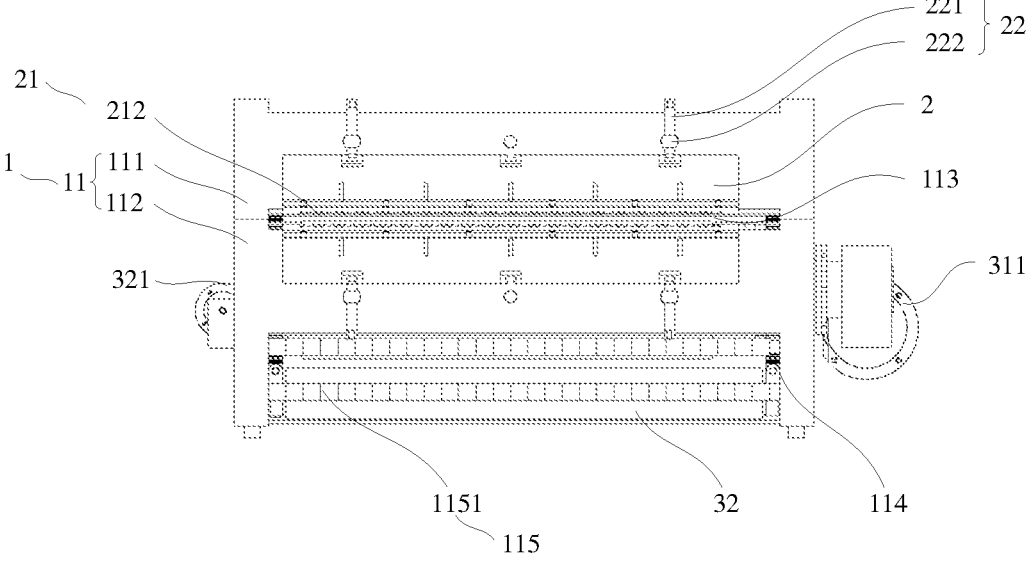
FIG. 5 is a front view of the separation device for steel cord cores of the conveyor belt provided in an embodiment of the present disclosure.

In some other embodiments of the present disclosure, with reference to FIG. 5, the spherical engagement structure described above is replaced with a cylindrical engagement structure shown in FIG. 5. The end of the adjustment screw 221 is provided with a cylindrical boss having a larger portion facing towards the cutting mechanism and a smaller portion opposite to the larger portion, and the cutting mechanism 2 is correspondingly provided with a cylindrical groove having a smaller portion facing towards cylindrical boss and larger portion opposite to the smaller portion. The cylindrical boss at the end of the adjustment screw 221 is engaged into the cylindrical groove on the cutting mechanism 2, so that the adjustment screw 221 may be kept connected with the cutting mechanism 2, and the adjustment screw 221 can rotate relative to the cutting mechanism 2.

The box 11 is provided with an adjustment nut 222 corresponding to the adjustment screw 221, and the adjustment nut 222 is fixedly connected to the box 11. The adjustment screw 221 is mounted to be fitted with the adjustment nut 222, and the adjustment screw 221 is rotated along the adjustment nut 222, so that the position of the adjustment screw 221 may be changed. Thus, the cutting mechanism 2 may be driven to slide along the box 11, and the position of the cutting mechanism 2 may be changed. Moreover, the threaded cooperation between the adjustment screw 221 and the adjustment nut 222 has a self-locking function, so that the cutting mechanism 2 may be locked in a target position.

In this way, by adjusting the positions of the cutting mechanisms 2 on two sides of the first opening 113, the positions of the knives 21 on the cutting mechanisms 2 on the two sides are also adjusted, and the purpose of adjusting the gap between the knives 21 on the two sides is also achieved. The positions of the knives 21 may be adaptively adjusted according to the position of the conveyor belt, so that the direction of movement of the conveyor belt at the knives 21 is in a straight line, reducing the impact of the conveyor belt on the knives 21 during movement. Meanwhile, by adjusting the gap between the knives 21, the separation device for steel cord cores of the conveyor belt provided in the embodiments of the present disclosure can also be used for conveyor belts with different thicknesses. In the case that the knife 21 with the flat knife edge 211 is used, by adjusting the position of the knife 21, the knife edge of the knife 21 is brought to the edge of the steel cord cores of the conveyor belt, so that the glue layer on both sides of the steel cord cores of the conveyor belt may be cut off at one time. In the case that the knife 21 with the shaped knife edges 212 is used, by adjusting the position of the knife 21, the glue layer between the steel cord cores of the conveyor belt may be cut at one time.

Further, with reference to FIGS. 1 and 5, in some embodiments of the present disclosure, a second opening 114 is further provided on the lower box 112 of the box 11. The second opening 114 is disposed parallel to the first opening 113, and the center line of the second opening 114 coincides with the center line of the first opening 113. The conveying mechanism 3 can allow the conveyor belt to move along the first opening 113 and the second opening 114. Specifically, when a steel cord core separation operation is performed on the conveyor belt, the conveyor belt joint site enters the interior of the box 11 from the second opening 114, the conveyor belt joint site is then conveyed to the first opening 113 through the conveying mechanism 3, and then the conveyor belt joint site fully extends out of the first opening 113. Next, the position of the knife 21 is adjusted, and then the conveying mechanism 3 is reversely rotated to move the conveyor belt joint site along the knife 21, so as to cut the glue layer of the conveyor belt joint site by the knife 21.

Figure 6:
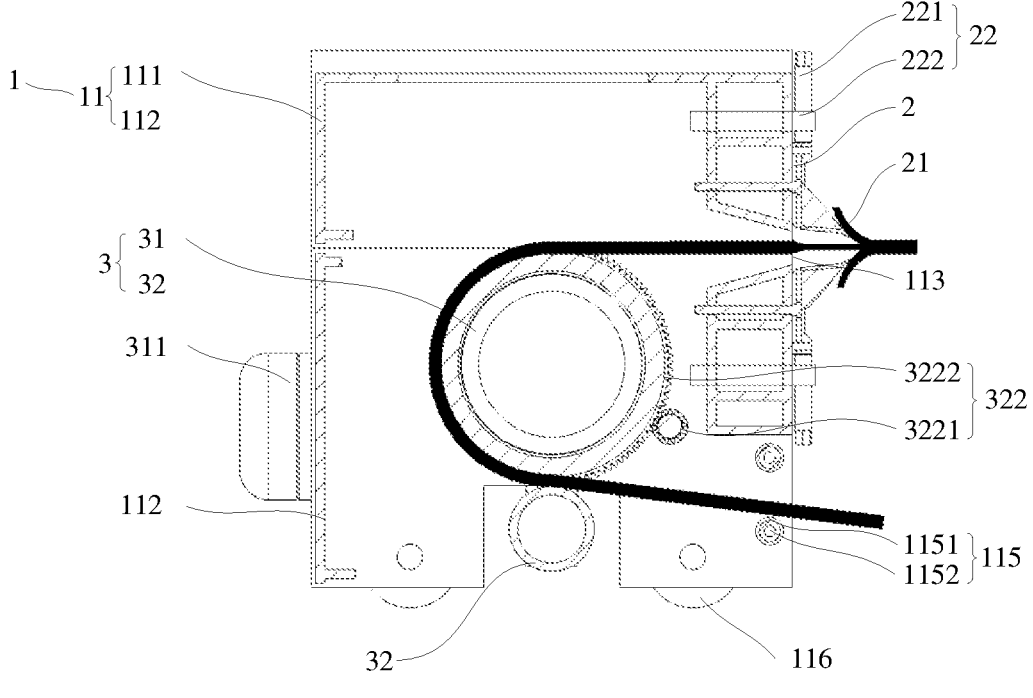
FIG. 6 is a schematic diagram of movement of the conveyor belt of the separation device for steel cord cores of the conveyor belt provided in an embodiment of the present disclosure.

For example, with reference to FIG. 6, it is a schematic view of separating steel cord cores of a conveyor belt joint site using a flat knife 21 in a separation device for steel cord cores of the conveyor belt provided in an embodiment of the present disclosure.

In addition, with reference to FIGS. 1 and 4, a guide assembly 115 is further provided in the box 11 near the second opening 114, the guide assembly 115 is provided with a guide portion 1151 which is rotatable about its own axis and is configured to guide the conveyor belt. During the operation of the conveying mechanism 3, the conveyor belt may be in a tension state or a relaxation state. particularly when the conveyor belt separation device starts or stops, which may cause the conveyor belt to fluctuate greatly, may cause the conveyor belt to collide with sharp sites near the second opening 114, and may damage the conveyor belt. The provision of the guide assembly 115 can avoid the occurrence of this situation. The guide assembly 115 may be provided in various forms. For example, with reference to FIGS. 1 and 4, in some embodiments of the present disclosure, on each side of the second opening 114, a guide shaft 1152 is provided. A plurality of guide portions 1151 are arranged on the guide shaft 1152. The guide portions 1151 are connected to the guide shaft 1152 through a rolling bearing, so that each of the guide portions 1151 may rotate relative to its own axis. In this way, the conveyor belt may move along the guide portions 1151, and the friction between the conveyor belt and the guide assembly 115 is rolling friction, which greatly reduces the friction between the conveyor belt and the guide assembly 115. In other embodiments of the present disclosure, a steel pipe may be mounted around the guide shaft 1152, and the steel pipe is connected to the guide shaft 1152 through a rolling bearing, so that the steel pipe may rotate relative to its own axis.

Specifically, with reference to FIGS. 4 and 6, the conveying mechanism 3 of the separation device for steel cord cores of the conveyor belt provided in the embodiment of the present disclosure comprises a drum 31 disposed in the lower box 112, the axis of rotation of the drum 31 is parallel to the first opening 113. In addition, a first driving portion 311 corresponding to the drum 31 is provided outside of the box 11, and the first driving portion 311 is configured to drive the drum 31.

In some embodiments of the present disclosure, the first driving portion 311 is an electric motor. Generally, the electric motor has a high rotational speed and a low torque. It is possible to provide a reduction gearbox, an input end of the reduction gearbox is connected to the motor, and an output end of the reduction gearbox is connected to the drum 31. In this way, the rotational speed can be reduced at the output end of the reduction gearbox, and the torque can be increased at the output end of the reduction gearbox, which is more suitable for the use requirements of the separation device for steel cord cores of the conveyor belt provided in the embodiment of the present disclosure.

In other embodiments of the present disclosure, the first driving portion 311 is a hydraulic motor. The driving medium of the hydraulic motor is hydraulic oil, and the operating parameters of the hydraulic motor may be conveniently adjusted by adjusting the parameters of the hydraulic oil, so as to adjust the rotational speed and torque of the hydraulic motor. In this way, the operating parameters of the hydraulic motor may be adjust to meet the use requirements of the separation device for steel cord cores of the conveyor belt provided in the embodiment of the present disclosure.

During the operation of the drum 31, the drum 31 may drive the conveyor belt to move due to the friction force between the drum 31 and the conveyor belt, which may thus allow the conveyor belt joint site to move relative to the knife 21. The friction force between the drum 31 and the conveyor belt may be increased by special structure of the drum 31. For example, the surface of the drum 31 may be provided with bumps, or the surface of the drum 31 may be covered by a layer of rubber or other materials with a high coefficient of friction, which can prevent the conveyor belt from slipping, thereby improving the transmission efficiency between the drum 31 and the conveyor belt.

Further, with reference to FIGS. 4 and 6, in some embodiments of the present disclosure, to increase the pressure of the conveyor belt to the drum 31 (thus, the friction force between the drum 31 and the conveyor belt), the conveying mechanism 3 also includes a roller 32 pressing the belt. Specifically, the roller 32 pressing the belt is disposed in the lower box 112 and is parallel to the drum 31. The diameter of the roller 32 is less than the diameter of the drum 31, and there is a gap between the roller 32 and the drum 31. The dimension of the gap is less than the thickness of the conveyor belt, so that the roller can press the conveyor belt against the surface of the drum 31, thereby increasing the pressure between the conveyor belt and the drum 31, and increasing the friction force of the conveyor belt and the drum 31.

In addition, the roller 32 may also rotate around its own axis, so that the roller 32 may rotate with the movement of the conveyor belt, and the friction between the conveyor belt and the roller 32 is rolling friction, thereby reducing the friction force between the roller 32 and the conveyor belt.

It should be noted that the roller 32 may also be in various forms. For example, a rotating shaft may be provided in the middle of the roller 32, a steel pipe is mounted around the rotating shaft, and the steel pipe and the rotating shaft are connected through a rolling bearing. It is also possible to replace the steel pipe with wheels. The wheels are arranged on the rotating shaft to form the roller 32.

Figure 7:
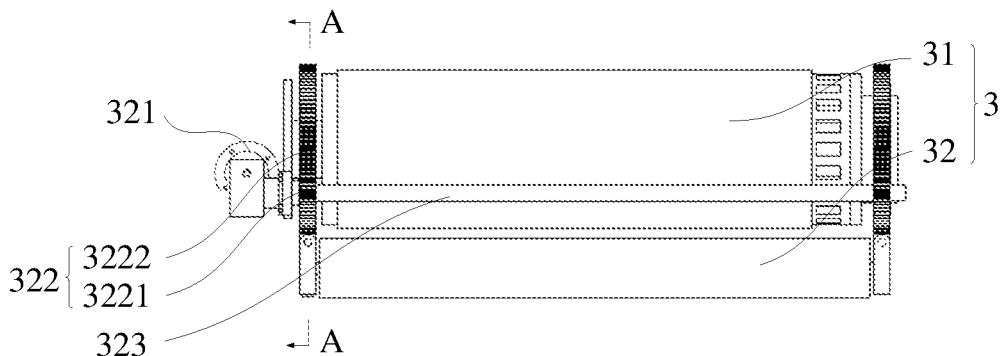
FIG. 7 is a partial schematic view of a roller transmission mechanism of the separation device for steel cord cores of the conveyor belt provided in an embodiment of the present disclosure.

With reference to FIG. 5, a second driving portion 321 corresponding to the roller 32 is further provided outside of the box 11. With reference to FIG. 7, a transmission mechanism 322 is provided between the second driving portion 321 and the roller 32, the second driving portion 321 drives the roller 32 to rotate around the drum 31 through the transmission mechanism 322. By controlling the movement parameters of the second driving portion 321, the roller 32 may be rotated around the drum 31 between a position directly above the drum 31 and a position directly below the drum 31. Specifically, the movement of the roller 32 may be controlled by controlling the start or stop of the second driving portion 321 or controlling the direction of rotation of the second driving portion 321.

Similarly, the second driving portion 321 may be selected from an electric motor or hydraulic motor, and the embodiments of the present disclosure are not limited thereto. Further, the transmission mechanism 322 between the second driving portion 321 and the roller 32 may be a strap for transmission, or may be a chain for transmission, and the embodiments of the present disclosure are not limited thereto.

Figure 8:
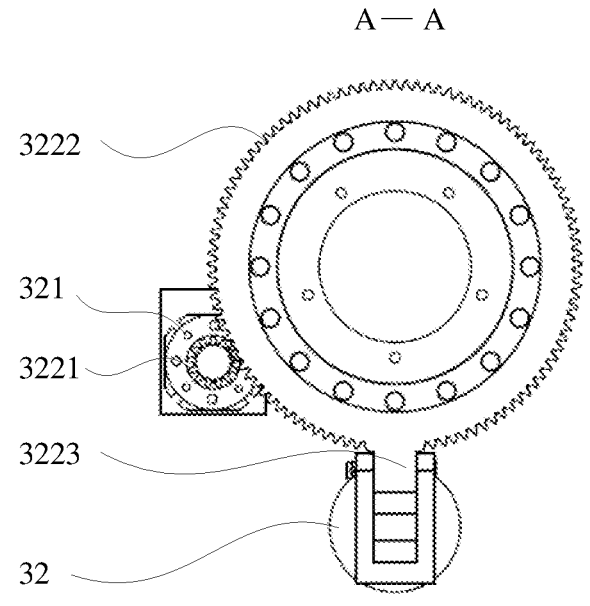
FIG. 8 is an A-A schematic diagram of the roller transmission mechanism of the separation device for steel cord cores of the conveyor belt provided in the embodiment of the present disclosure.

By way of example, with reference to FIGS. 7 and 8, in some embodiments of the present disclosure, the transmission between the second driving portion 321 and the roller 32 is achieved by a gear mechanism.

Specifically, the transmission mechanism 322 includes a driving gear 3221 and a driven gear 3222. The driving gear 3221 is disposed on the second driving portion 321, and the driven gear 3222 is disposed coaxially with the drum 31 and may coaxially rotate around the drum 31. As shown in the figures, the driving gear 3221 and the driven gear 3222 are connected to one another through an external meshing.

In addition, the roller 32 is connected to the driven gear 3222. When the second driving portion 321 drives the driving gear 3221 and the driven gear 3222 to rotate, the driven gear 3222 can drive the roller 32 to rotate around the drum 31.

It should be noted that the connection between the roller 32 and the driven gear 3222 may be achieved by means of fastener, welding, snapping or the like, and the embodiments of the present disclosure are not limited thereto.

In addition, with reference to FIGS. 7 and 8, a rolling bearing may be disposed between the driven gear 3222 and the drum 31 so that the driven gear 3222 may be rotated around the drum 31. Alternatively, a sliding bearing may be disposed between the driven gear 3222 and the drum 31 so that the driven gear 3222 may be rotated around the drum 31. The embodiments of the present disclosure are not limited thereto.

For a situation in which the second driving portion 321 is an electric motor, a reduction gearbox may also be disposed on the output shaft of the electric motor to reduce the output speed and increase the output torque. In this case, the driving gear 3221 may be disposed on the output shaft of the reduction gearbox.

With reference to FIG. 8, in some embodiments of the present disclosure, the driven gear 3222 is provided with a raised structure 3223 extending radially therefrom, and the roller 32 is connected to the raised structure 3223. In this way, it easy to connect the driven gear 3222 with the roller 32. The raised structure 3223 is integral with the driven gear 3222, thus confers greater force strength to the raised structures 3223.

Further, with reference to FIG. 6, to prevent the movement path of the roller 32 from interfering with the driving gear 3221, and to enable the roller 32 to move along the movement path of the conveyor belt, in some embodiments of the present disclosure, the driving gear 3221 and the roller 32 are disposed on different sides of the conveyor belt movement path. Specifically, the driving gear 3221 and the drum 31 are disposed on one side of the conveyor belt movement path, and the roller 32 is disposed on another side of the conveyor belt movement path.

Further, with reference to FIG. 7, in order for the movement of the roller 32 to be stable, in some embodiments of the present disclosure, there are two driven gears 3222 respectively disposed on two ends of the drum 31, and the roller 32 is disposed between the two driven gears 3222.

On that basis, with reference to FIG. 7, there are also two driving gears 3221 respectively corresponding to the two driven gears 3222, and the two driving gears 3221 share the second driving portion 321. To achieve transmission between the two driven gears 3222, the two driving gears 3221 are connected to one another by a synchronous shaft 323. When the driving gear 3221 adjacent to the second driving portion 321 is rotated, the synchronous shaft 323 drives the other driving gear 3221 to rotate, thereby enabling the two driven gears 3222 to rotate synchronously. Therefore, the rotation of the roller 32 of the separation device for steel cords of the conveyor belt provided in the embodiments of the present disclosure is stable and reliable.

In addition, with reference to FIGS. 1, 4, and 6, in some embodiments of the present disclosure, the lower end of the box 11 is further provided with a moving wheel 116. By means of the moving wheel 116, the separation device for steel cord cores of the conveyor belt provided in the embodiments of the present disclosure can be conveniently moved.

It should be noted that with reference to FIGS. 9 to 12, the entire movement process of the separation device for steel cord cores of the conveyor belt provided in the embodiment of the present disclosure will be briefly described below.

Figure 9:
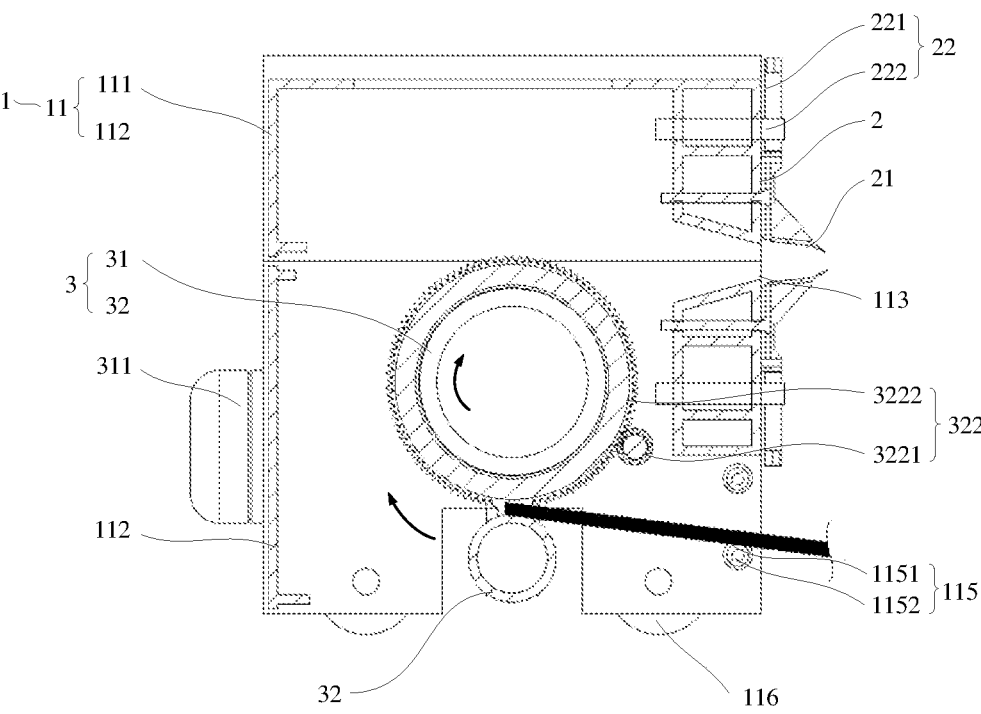
FIG. 9 is a first schematic diagram of the operation of the separation device for steel cord cores of the conveyor belt provided in an embodiment of the present disclosure.

Specifically, with reference to FIG. 9, at an initial work stage of a separation device for steel cord cores of the conveyor belt provided in an embodiment of the present disclosure, a conveyor belt joint site is inserted between a roller 32 and a drum 31 via guide assembly 115. At this time, a first driving portion 311 and a second driving portion 321 are started, and the drum 31 and the roller 32 are driven to rotate in the directions indicated by the arrows in the figure, to drive the conveyor belt to move synchronously to the position as shown in FIG. 10.

Figure 10:
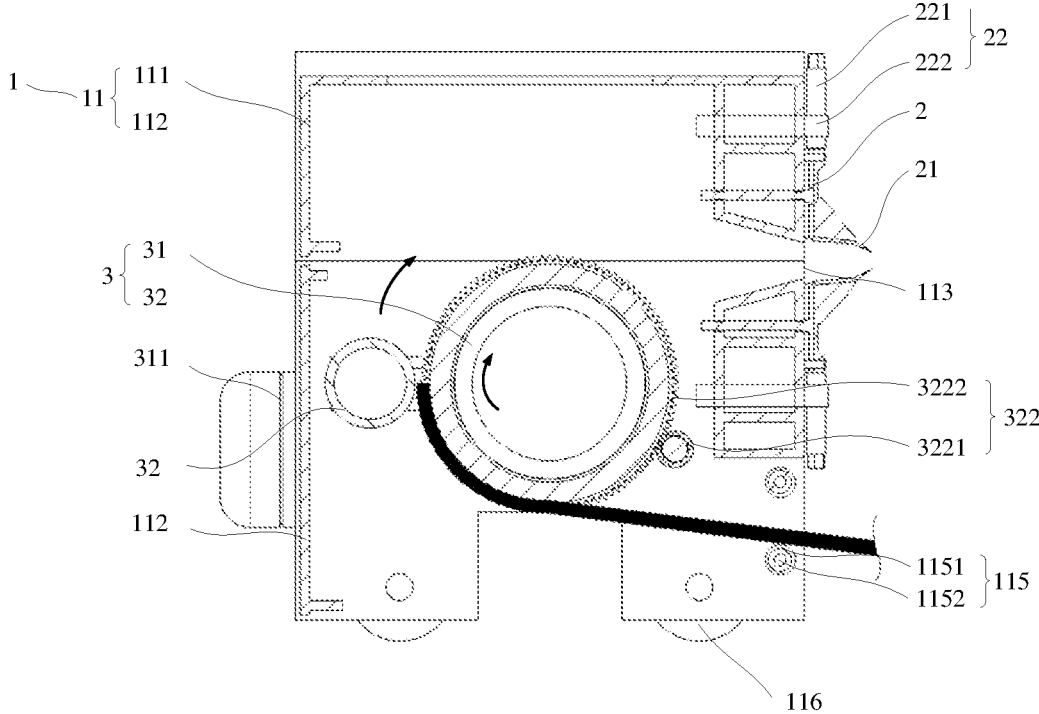
FIG. 10 is a second schematic diagram of the operation of the separation device for steel cord cores of the conveyor belt provided in an embodiment of the present disclosure.
Figure 11:
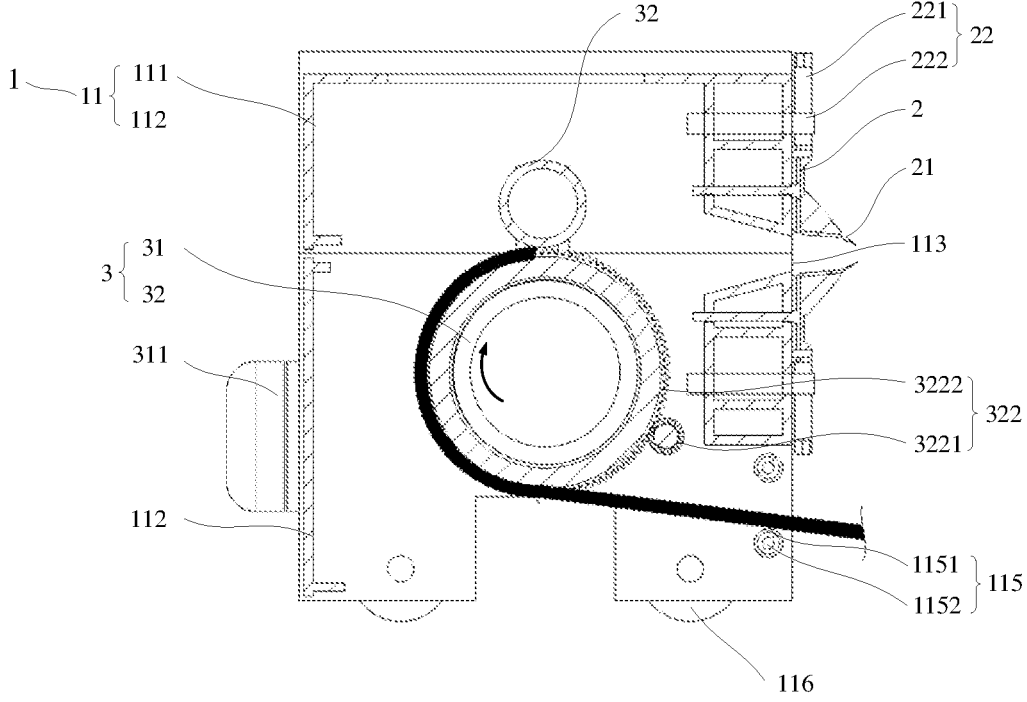
FIG. 11 is a third schematic diagram of the operation of the separation device for steel cord cores of the conveyor belt provided in an embodiment of the present disclosure.

With reference to FIG. 10, the first driving portion 311 and the second driving portion 321 continue to operate, so that the drum 31 and the roller 32 continue to rotate in the directions indicated by the arrows in the figure, and the conveyor belt is driven to move synchronously to the position as shown in FIG. 11.

With reference to FIG. 11, when the roller 32 is located directly above the drum 31, the second driving portion 321 is stopped, and the roller 32 no longer continues to rotate around the drum 31. It should be noted that at this time, the first driving portion 311 remains in operation, so that the conveyor belt continues to move toward the knife 21. The roller 32 rotates around its own axis due to the friction force of the conveyor belt.

Figure 12:
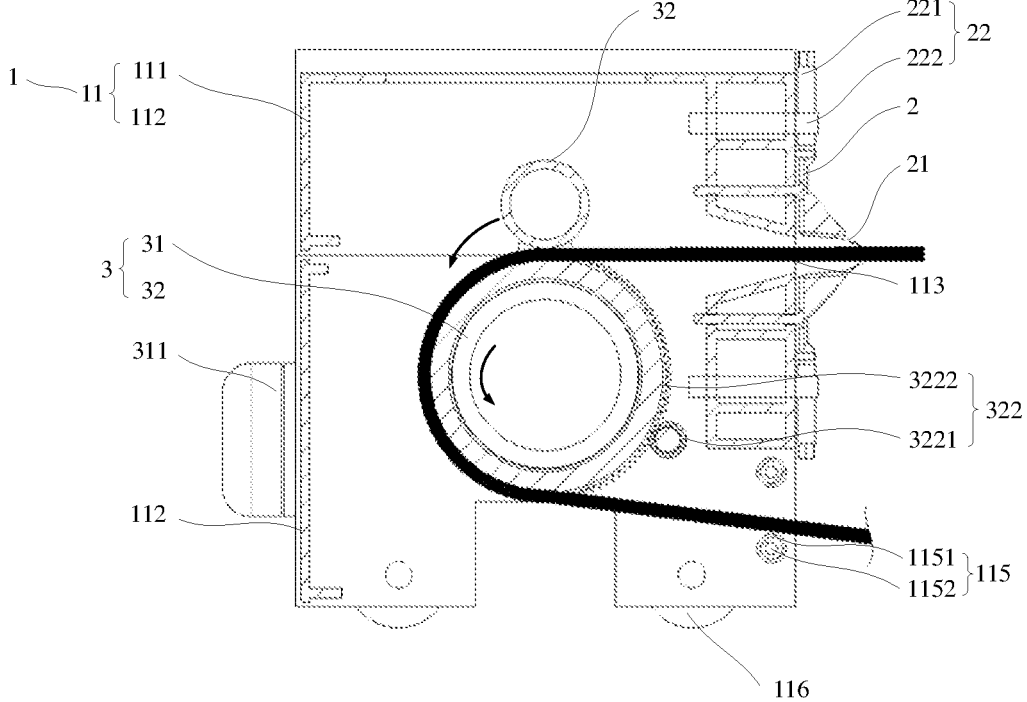
FIG. 12 is a fourth schematic diagram of the operation of the separation device for steel cord cores of the conveyor belt provided in an embodiment of the present disclosure.

With reference to FIG. 12, when the conveyor belt joint site completely extends out of the knife 21, the first driving portion 311 is stopped.

First of all, the glue layer on the upper and lower sides of the conveyor belt is cut off by using the knives 21 with the flat knife edges 211. The positions of the knives 21 with the flat knife edges 211 are adjusted in such a way that the gap between the upper knife 21 and lower knife 21 is equal to the diameter of the steel cord cores of the conveyor belt.

Specifically, the second driving portion 321 is then started, and the operating direction of the second driving portion 321 is opposite to the operating direction of the above steps, so that the roller 32 rotates in the direction indicated by the arrow in the figure. Then, the roller 32 returns to the position in FIG. 9, and then the second driving portion 321 is stopped. Then, the first driving portion 311 is started, and the operating direction of the first driving portion 311 is opposite to the operating direction of the above steps, so that the conveyor belt moves toward the second opening 114. In this way, with reference to FIG. 6, the knives 21 with the flat knife edges 211 complete the work of cutting off the glue layer on the upper and lower sides of the steel cord cores of the conveyor belt joint site. Then, the knives 21 with the flat knife edges 211 are replaced with the knife 21 with the shaped knife edges 212, and the above steps are repeated to complete the work of cutting off the glue layer between the steel cord cores of the conveyor belt joint site, thereby completing the work of separating the steel cord cores of the conveyor belt joint site.

The embodiments of the present disclosure described above are for description only, and do not represent the advantages and disadvantages of the embodiments. The above are only the preferred embodiments of the present disclosure, and are not intended to limit the scope of patent of the present disclosure. Any equivalent structure or equivalent process transformation made by using the contents of the description and drawings of the present disclosure, or directly or indirectly used in other related technical fields, is also included in the scope of patent protection of the present disclosure.

INDUSTRIAL APPLICABILITY

In the separation device for steel cord cores of the conveyor belt provided in the embodiments of the present disclosure, the dimension of the knife along the width direction of the conveyor belt is greater than or equal to the width of the conveyor belt, so that the steel cord cores of the conveyor belt joint site can be separated along the entire width direction of the conveyor belt from one cut with the knife. Therefore, the operation efficiency of the separation device for steel cord cores of the conveyor belt provided in the embodiments of the present disclosure is improved, thereby solving the problems of high labor intensity and long time consumption when separating the steel cord cores of the conveyor belt joint.

The invention claimed is:

1. A separation device for steel cord cores of a conveyor belt, comprising:

a mount; at least one cutting mechanism connected to the mount, wherein the cutting mechanism is provided with knives configured to separate, the steel cord cores of a joint site of the conveyor belt, an extension direction of each of the knives is perpendicular to an extension direction of the conveyor belt, and a cutting distance of each of the knives along the width direction extension direction of each of the knives is configured to be greater than or equal to a distance of the conveyor belt along a direction perpendicular to the extension direction of the conveyor belt; and a conveying mechanism fixedly connected to the mount, and configured to move the joint site of the conveyor belt along the knives, wherein the mount is a box structure comprising an upper box and a lower box, the upper box and the lower box are detachably connected to each other, the cutting mechanism is disposed at an interface between the upper box and the lower box, and the conveying mechanism is disposed in the lower box, wherein a first opening is provided at the interface between the upper box and the lower box, the cutting mechanism is disposed at the first opening, and the extension direction of each of the knives is parallel to an extension direction of the first opening, wherein the separation device comprises two cutting mechanisms which are arranged on two sides of the first opening respectively, knife edges of the knives of the two cutting mechanism are arranged opposite to one another, and the conveying mechanism is configured to move the joint site of the conveyor belt between two knives, wherein an adjustment assembly is provided between the cutting mechanisms and the box structure, the adjustment assembly is movably connected to the box structure, and is configured to allow the knives to slide on the box structure in a direction perpendicular to the first opening, and the adjustment assembly is further configured to lock the cutting mechanism in a target position.

2. The separation device for the steel cord cores of the conveyor belt according to claim 1, wherein the knives comprises knives with a flat knife edge, the flat knife edge is in a straight line and is configured to separate the steel cord cores along the extension direction of the conveyor belt; or the knives comprises knives with a shaped knife edge, the shaped knife edge comprises a plurality of semi-circular cutting edges, and the shaped knife edge is configured to separate the steel cord cores along the direction perpendicular to the extension direction of the conveyor belt.

3. The separation device for the steel cord cores of the conveyor belt according to claim 2, wherein a diameter of the semi-circular cutting edges is configured to be equal to a diameter of the steel cord cores of the conveyor belt, and a spacing between the semi-circular cutting edges is equal to a spacing between the steel cord cores of the conveyor belt.

4. The separation device for the steel cord cores of the conveyor belt according to claim 1, wherein the tips of knife edges of the knives are inclined toward the joint site of the conveyor belt when separating the steel cord cores of the joint site of the conveyor belt.

5. The separation device for the steel cord cores of the conveyor belt according to claim 1, wherein the adjustment assembly comprises an adjustment screw, the adjustment screw is movably connected to the cutting mechanism, the box structure is provided with an adjustment nut corresponding to the adjustment screw, the adjustment screw is in threaded cooperation with the adjustment nut, a rotation of the adjustment screw drives the cutting mechanism to slide on the box structure in a direction perpendicular to the first opening, and the cutting mechanism is configured to be locked in a target position by a threaded self-locking of the adjustment screw and the adjustment nut.

6. The separation device for the steel cord cores of the conveyor belt according to claim 1, wherein the lower box is provided with a second opening, the second opening is parallel to the first opening, a center line of the second opening coincides with and a center line of the first opening, and the conveying mechanism configured to move the conveyor belt along the first opening and the second opening.

7. The separation device for the steel cord cores of the conveyor belt according to claim 6, wherein a guide assembly is provided within the box structure at a position adjacent to the second opening, the guide assembly comprises guide portions, and the guide portions are rotatable along their own axis and are configured to guide the conveyor belt.

8. The separation device for the steel cord cores of the conveyor belt according to claim 1, wherein the conveying mechanism comprises a drum, an axis of rotation of the drum is located in the lower box and is parallel to the first opening, a first driving portion corresponding to the drum is provided outside of the box structure, the first driving portion is configured to drive the drum to rotate, and the conveyor belt is in contact with a surface of the drum and moves with a rotation of the drum.

9. The separation device for the steel cord cores of the conveyor belt according to claim 8, wherein the conveying mechanism further comprises a roller for pressing the conveyor belt, the roller is disposed in the lower box and is parallel to the drum, a diameter of the roller is less than a diameter of the drum, a gap is present between the roller and the drum, a dimension of the gap is less than a thickness of the conveyor belt, the roller is configured to press the conveyor belt against a surface of the drum, and the roller is rotatable around its own axis.

10. The separation device for the steel cord cores of the conveyor belt according to claim 9, wherein a second driving portion corresponding to the roller is provided outside of the box structure, a transmission mechanism is provided between the second driving portion and the roller, and a movement parameter of the second driving portion is controlled to allow the roller to rotate around the drum between a position directly above the drum and a position directly below the drum.

11. The separation device for the steel cord cores of the conveyor belt according to claim 10, wherein the transmission mechanism comprises at least one driving gear and at least one driven gear, the driving gear is disposed on the second driving portion, the driven gear is coaxially arranged with the drum and is rotatable around the drum, the driving gear is externally meshed with the driven gear, the roller is connected to the driven gear, the second driving portion drives the driving gear and the driven gear to rotate, and the driven gear drive the roller to rotate around the drum.

12. The separation device for the steel cord cores of the conveyor belt according to claim 11, wherein the driven gear is provided with a raised structure radially extending therefrom, the roller is connected to the raised structure, and the raised structure drives the roller to rotate around the drum with a rotation of the driven gear.

13. The separation device for the steel cord cores of the conveyor belt according to claim 12, wherein the driving gear and the roller are disposed on different sides of a movement path of the conveyor belt, the driving gear and the drum are disposed on one side of the movement path of the conveyor belt, and the roller is disposed on another side of the movement path of the conveyor belt.

14. The separation device for the steel cord cores of the conveyor belt according to claim 13, wherein the transmission mechanism comprises two driven gears which are disposed at two ends of the drum respectively, and the roller is disposed between the two driven gears.

15. The separation device for the steel cord cores of the conveyor belt according to claim 14, wherein the transmission mechanism comprises two driving gears corresponding to the two driven gears, the two driving gears share the second driving portion, and the two driving gears are connected to one another by means of a synchronous shaft.

16. A separation device for steel cord cores of a conveyor belt, comprising:

a mount;

at least one cutting mechanism connected to the mount, wherein the cutting mechanism is provided with knives configured to separate the steel cord cores of a joint site of the conveyor belt, an extension direction of each of the knives is perpendicular to an extension direction of the conveyor belt, and a cutting distance of each of the knives along the extension direction of each of the knives is configured to be greater than or equal to a distance of the conveyor belt along a direction perpendicular to the extension direction of the conveyor belt; and a conveying mechanism fixedly connected to the mount, and configured to move the joint site of the conveyor belt along the knives, wherein the mount is a box structure comprising an upper box and a lower box, the upper box and the lower box are detachably connected to each other, the cutting mechanism is disposed at an interface between the upper box and the lower box, and the conveying mechanism is disposed in the lower box, wherein a first opening is provided at the interface between the upper box and the lower box, the cutting mechanism is disposed at the first opening, and an extension direction of the knives is parallel to an extension direction of the first opening, wherein the conveying mechanism comprises a drum, an axis of rotation of the drum is located in the lower box and is parallel to the first opening, a first driving portion corresponding to the drum is provided outside of the box structure, the first driving portion is configured to drive the drum to rotate, and the conveyor belt is in contact with a surface of the drum and moves with a rotation of the drum, wherein the conveying mechanism further comprises a roller for pressing the conveyor belt, the roller is disposed in the lower box and is parallel to the drum, a diameter of the roller is less than a diameter of the drum, a gap is present between the roller and the drum, a dimension of the gap is less than a thickness of the conveyor belt, the roller is configured to press the conveyor belt against a surface of the drum, and the roller is rotatable around its own axis, wherein a second driving portion corresponding to the roller is provided outside of the box structure, a transmission mechanism is provided between the second driving portion and the roller, and a movement parameter of the second driving portion is controlled to allow the roller to rotate around the drum between a position directly above the drum and a position directly below the drum.

* * * * *